Patented Feb. 17, 1925.

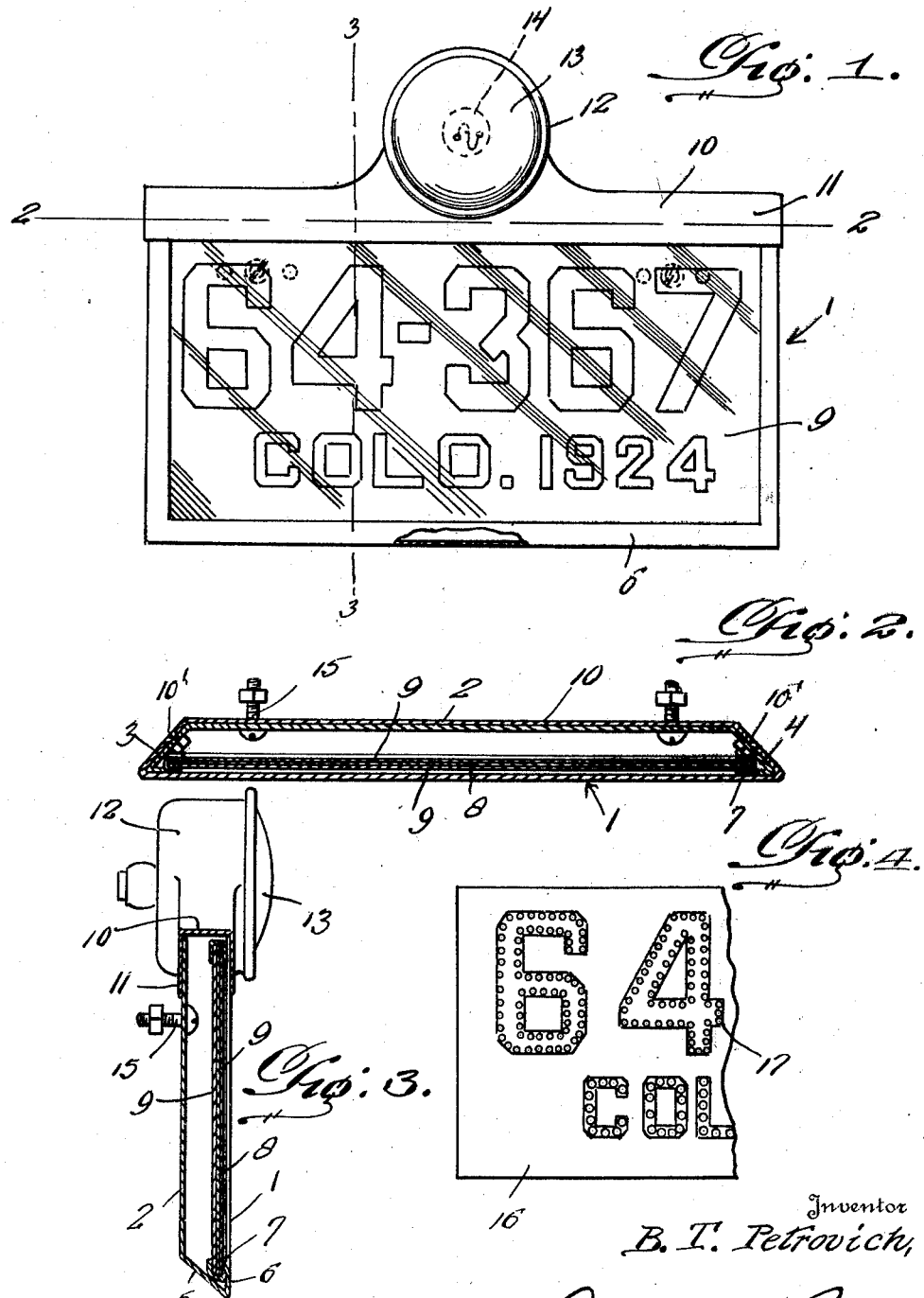

1,526,868

UNITED STATES PATENT OFFICE.

BOZO T. PETROVICH, OF PUEBLO, COLORADO.

COMBINED AUTOMOBILE TAIL-LIGHT AND ILLUMINATED-LICENSE-PLATE HOLDER.

Application filed September 18, 1924. Serial No. 738,452.

*To all whom it may concern:*

Be it known that I, Bozo T. Petrovich, a citizen of the United States, residing at Pueblo, in the county of Pueblo and State of Colorado, have invented certain new and useful Improvements in a Combined Automobile Tail Light and Illuminated-License-Plate Holder, of which the following is a specification.

This invention relates to improvements in combined automobile tail lights and illuminated license plate holders and has for its principal object to provide a simple and efficient means for illuminating a license plate so that the same may be readily visible at night for a suitable distance.

Another important object of the invention is to provide a combined tail light and illuminated license plate holder of the above mentioned character, which is of such a construction as to permit the ready removal of the license plate therefrom when it becomes necessary to change the license plate such as at the termination of the period for which the license has been granted.

A still further object of the invention is to provide a combined tail light and license place holder of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a front elevation of the combined tail light and illuminated license plate holder embodying my invention.

Figure 2 is a sectional view taken approximately on line 2—2 of Figure 1.

Figure 3 is a sectional view taken approximately on line 3—3 of Figure 1, and

Figure 4 is a fragmentary front elevation of the modification of the license plate.

In the drawing, wherein for the purpose of illustration is shown the preferred embodiment of my invention, the numeral 1 designates the casing of the improved combined tail light and illuminated license plate holder and the same is substantially of rectangular design. The casing is open at its front as well as at its top as is clearly illustrated in Figure 3 of the drawing. The back of the casing is indicated at 2 and the end walls at 3 and 4 respectively. The end walls converge toward the back 2 of the casing for the purposes hereinafter to be more fully described. The bottom of the casing is illustrated at 5 and the same slopes upwardly from the open front to the back 2.

A license plate retaining flange 6 extends around the front edges of the casing.

Adapted to be removably supported within the casing 1 is the rectangular shaped frame 7, the same being preferably formed of metal, the same being furthermore channeled to receive the license plate 8 which is preferably formed of translucent material and has placed thereon suitable indicia which is indicative of the license number issued by the State or Province having the authority to issue the license, the name of the State or Province as well as the year for which the license is issued being also placed on the license plate. On each side of the translucent license plate 8 arranged within the frame 7 are the transparent members 9 which are preferably formed of celluloid. The frame 7 will support the license plate and the transparent members on the opposite sides thereof in proper assembled relation and furthermore in the rigid manner.

The frame 7 and the license plate supported therein will be disposed in a vertical position within the casing 1 against the retaining flange 6 and the sloping end walls as well as the sloping bottom 5 will prevent the frame and the license plate supported therein from accidental displacement from its vertical position within the casing as is clearly illustrated in Figures 2 and 3 of the drawing.

The cover for the open top of the casing is designated at 10 and the same is provided with the depending flange 11 for cooperation with the upper edges of the casing, it being understood of course that the cover is of the same configuration as the casing. Fastening screws or bolts such as are shown at 10′ extend through suitable registering openings provided in the depending flanges of the cover 10 at the ends thereof and the sloping end walls of the casing for securing the cover against accidental displacement from the casing. The cover 10 is provided with a centrally located and enlarged portion 12, the front of which is open and supports therein the colored lens 13. An electric bulb 14 is mounted in the enlarged portion 12 of the cover 10 for the purpose of illuminating the casing 1 and the license plate supported therein and the provision of the colored lens 13 in connection with the bulb 14 will provide a tail light. It is also to be understood that the inner faces of the casing 1 will provide a reflector surface for cooperation with the electric bulb 14 whereby the rays of light therefrom will illuminate the license plate in the manner well known in the art.

The rear wall 2 of the casing has associated therewith the attaching bolts 15 which provides a means for supporting the combined tail light and illuminated license plate holder on the rear portion of an automobile.

In Figure 4 of the drawing, a modification of license plate is shown wherein the same comprises a sheet metal plate 16, the indicia thereon which is indicative of the license number and the name of the State or Province issuing the license as well as the year for which the license is issued having perforations 17 extending therethrough so that the license number may be readily visible at night from a suitable distance.

It will thus be seen from the foregoing description, that a combined tail light and illuminated license plate holder has been provided which may be readily and easily assembled and supported in position on the rear of an automobile and will at all times insure the illumination of the license plate when the tail light is illuminated.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. An illuminated license plate holder comprising a casing having its front and top open, a retaining flange around the front edges of the casing, the license plate removably supported in the casing against said flange, the sides of the casing converging rearwardly, the bottom of the casing sloping upwardly from the front thereof to support the license plate in a vertical position in the casing, and a removable cover for the top of the casing and means illuminating the license plate.

2. An illuminated license plate holder comprising a casing having its front and top open, a retaining flange around the front edges of the casing, the license plate removably supported in the casing against said flange, the sides of the casing converging rearwardly, the bottom of the casing sloping upwardly from the front thereof to support the license plate in a vertical position in the casing, and a removable cover for the top of the casing, said cover having an enlarged central portion arranged centrally thereon and provided with an opening in the front thereof, a lens mounted in said opening, and a source of light supported in the enlarged central portion of the cover for illuminating the lens and the license plate in the casing.

3. An illuminated license plate holder comprising a casing having its front and top open, a retaining flange extending around the front edges of the casing, a channeled frame removably supported in the casing against the flange, a translucent license plate supported in the frame, transparent members in said frame on the opposite sides of the translucent license plate, the sides of the casing converging rearwardly and the bottoms opening upwardly from the front thereof to support the frame in a vertical position against the retaining flange, a cover fitting over the open top of the casing, and means for illuminating the license plate.

In testimony whereof I affix my signature.

BOZO T. PETROVICH.